United States Patent [19]
Fujimoto

[11] Patent Number: 5,737,097
[45] Date of Patent: Apr. 7, 1998

[54] INFORMATION COMMUNICATION APPARATUS

[75] Inventor: Munenori Fujimoto, Tokyo, Japan

[73] Assignee: Matsushita Graphic Communication Systems, Inc., Tokyo, Japan

[21] Appl. No.: 629,324

[22] Filed: Apr. 8, 1996

Related U.S. Application Data

[63] Continuation of Ser. No. 229,987, Apr. 19, 1994, which is a continuation of Ser. No. 888,717, May 27, 1992, Pat. No. 5,317,422.

[30] Foreign Application Priority Data

May 28, 1991 [JP] Japan ................... 3-123486
May 28, 1991 [JP] Japan ................... 3-123488

[51] Int. Cl.⁶ .................................... H04N 1/00
[52] U.S. Cl. ............. 358/476; 358/400; 358/498; D14/118
[58] Field of Search ............ 358/400, 476, 358/498; 379/100; D14/118, 124, 132, 134; H04N 1/00

[56] References Cited

U.S. PATENT DOCUMENTS

| | | | |
|---|---|---|---|
| D. 267,799 | 2/1983 | Esaki et al. | D14/118 |
| D. 280,508 | 9/1985 | Nasui et al. | D14/118 |
| D. 286,044 | 10/1986 | Kando | D14/94 |
| D. 310,215 | 8/1990 | Tsukada et al. | D14/118 |
| D. 315,555 | 3/1991 | Komatsu | D14/118 |
| D. 329,048 | 9/1992 | Yoshihara | D14/118 |
| D. 329,230 | 9/1992 | Masuda | D14/118 |
| D. 331,051 | 11/1992 | Inukai | D14/118 |
| D. 331,578 | 12/1992 | Hirohi et al. | D14/118 |
| D. 331,751 | 12/1992 | Short | D14/118 |
| D. 331,752 | 12/1992 | Kashiwabara et al. | D14/118 |
| D. 331,924 | 12/1992 | Sawada et al. | D14/118 |
| D. 332,258 | 1/1993 | Urashihara et al. | D14/118 |
| D. 344,513 | 2/1994 | Taniuchi et al. | D14/118 |
| D. 345,154 | 3/1994 | Kashiwabara et al. | D14/118 |
| D. 345,155 | 3/1994 | Hiroki et al. | D14/118 |
| 4,743,976 | 5/1988 | Katakabe et al. | 379/100 |
| 4,777,533 | 10/1988 | Watanabe | 358/296 |
| 5,119,078 | 6/1992 | Grant . | |
| 5,122,786 | 6/1992 | Radar . | |
| 5,130,817 | 7/1992 | Iwaki | 358/400 |
| 5,183,431 | 2/1993 | Todokoro | 358/400 |
| 5,206,737 | 4/1993 | Sugiyama | 358/498 |
| 5,317,422 | 5/1994 | Fujimoto | 358/476 |
| 5,454,555 | 10/1995 | Kiyohara | 271/9 |

FOREIGN PATENT DOCUMENTS

| | | | |
|---|---|---|---|
| 110773 | 1/1989 | Japan . | |
| 6105061 | 4/1994 | Japan . | |
| 6169344 | 6/1994 | Japan . | |
| 6169363 | 6/1994 | Japan | H04N 1/00 |
| 2278344 | 11/1994 | United Kingdom | 358/400 |

*Primary Examiner*—Thomas L. Stoll
*Attorney, Agent, or Firm*—Lowe, Price, LeBlanc & Becker

[57] ABSTRACT

The present invention provides a facsimile machine having a larger cover plate capable of serving as a manuscript holder as well as a recording paper tray. A facsimile machine comprises a main body including an operation panel provided at its front end, a manuscript inlet opening provided at its substantially the center, and a recording paper outlet opening provided behind the manuscript inlet opening. A tray serving as a manuscript holder as well as a recording paper tray is hingedly supported at a rear end of the main body so as to be opened or closed between an opened position where the tray extends rearward and obliquely upward and a closed position where the tray covers the upper surface of the main body. And, the tray has a longer length enough to reach the front edge of the main body when it is closed, and is formed with a cutout at its front end so as to expose the operation panel even when the tray is closed. Furthermore, the operation panel includes a plurality of buttons obliquely arrayed with respect to the front edge of the main body.

13 Claims, 4 Drawing Sheets

INFORMATION COMMUNICATION APPARATUS

This application is a continuation of application Ser. No. 08/229,987 filed Apr. 19, 1994, which in turn is a continuation of application Ser. No. 07/880,717 filed May 27, 1992, now U.S. Pat. No. 5,317,422.

BACKGROUND OF THE INVENTION

1. Field of the Invention

The present invention relates to an information communication apparatus such as a facsimile machine.

2. Description of the Prior Art

First of all, in a conventional art, there has been known an information communication apparatus such as a facsimile machine, as shown in FIG. 7, which comprises a manuscript inlet opening 2 provided at central portion of an upper surface of the apparatus main body 1, a recording paper outlet opening 3 provided behind the manuscript inlet hole 2, and a recording paper tray 4 disposed behind the recording paper outlet opening 3 so as to serve as a manuscript holder as well as a recording paper holder. This recording paper tray 4 is an insertion type that is detachably installed on the apparatus main body 1 as occasion demands. Moreover, a reference numeral 5 denotes a manuscript outlet.

However, such a conventional apparatus is not preferable in view of space utility, because the recording paper tray 4 undesirably protrudes rearward and upward from the apparatus main body 1. That is, a space required for installing such a conventional information communication apparatus becomes fairly larger than the occupying space of the apparatus main body 1 itself, because of this reawardly and upwardly extending paper tray 4.

Furthermore, according to the conventional constitution, the system in the apparatus main body 1 tends to be contaminated by dust or small particles in the air, since the manuscript inlet opening 2 is always opened to the air. In the worst case, such a contamination may induce function errors in ordinary communication operations of the information communication apparatus.

In order to solve above problem, the Japanese Unexamined Patent Application No. SHO 64-10773 proposes to newly provide a cover plate hingedly supported on the upper portion of the communication apparatus. That is, with this proposed arrangement, the manuscript inlet opening is concealed together with an operation panel located in the periphery of the manuscript inlet opening by closing the cover plate. To the contrary, this cover plate can be used as a manuscript holder by locating it at its opened position.

However, the above proposed apparatus disclosed in the Japanese Unexamined Patent Application No. SHO 64-10773 is not convenient yet in the following point.

In the proposed apparatus, the cover plate is provided in front of the recording paper outlet opening. Such a structure can merely let the cover plate serve as a manuscript holder, not as a recording paper tray. Furthermore, the cover plate is designed to cover a relatively small area on the upper surface of the apparatus. Therefore, when the cover plate is raised up so as to be used as a manuscript holder, the length of the cover plate is not sufficiently long to hold the manuscripts stably. Moreover, other inconvenience is that the cover plate must be opened every time when the operation panel is manipulated for ordinary communication purposes such as a normal telephone call.

Secondly, in the conventional art, there are many information communication apparatus including dialing buttons of push button type. Usually, these dialing buttons consist of twelve push buttons arrayed into four lines each including three buttons; i.e. in a form of a matrix of three rows and four lines. And further, a layout of these dialing buttons is usually designed in such a manner that these rows and lines are disposed in parallel with or normal to the front edge of the apparatus main body.

However, it is found by the inventor of the present application that such a conventional button layout is not so easy to operate, when an operator stands to directly oppose to these dialing buttons.

SUMMARY OF THE INVENTION

First of all, the present invention has a purpose, in view of above problems and disadvantages encountered in the conventional art, to provide an information communication apparatus such as a facsimile machine wherein there is provided a larger cover plate capable of serving as a manuscript holder as well as a recording paper tray, thereby realizing an improved information communication apparatus having good operability without unnecessary increasing the apparatus size as s whole.

To accomplish this end, a first aspect of the present invention provides an information communication apparatus comprising: an apparatus main body; an operation panel portion provided at a front end of an upper surface of the apparatus main body; a manuscript inlet opening provided at substantially the center of the upper surface of said apparatus main body; a recording paper outlet opening provided behind the manuscript inlet opening on said apparatus main body; and a tray serving as a manuscript holder as well as a recording paper tray (i.e. a combined manuscript holder and recording paper tray) which is hingedly supported at a rear end of the apparatus main body so as to be opened or closed between an opened position where the tray extends rearward and obliquely upward and a closed position where the tray covers the upper surface of the apparatus main body.

And, the combined manuscript holder and recording paper tray has a longer length enough to reach the front edge of the apparatus main body when it is fallen to its closed positions. Furthermore, this combined manuscript holder and recording paper tray is formed with a cutout at its front end so that the operation panel portion can be exposed even when the manuscript holder and combined recording paper tray is positioned at the closed position.

With this arrangement, when the combined manuscript holder and recording paper tray is closed, it serves as a cover plate concealing the manuscript inlet opening so as to prevent any dusts or small particles from entering into the apparatus main body through the manuscript inlet opening.

Furthermore, in this case, the operation panel portion located on the center of the front end of the apparatus main body can be manipulated since it exposes through the cutout formed on the combined manuscript holder and recording paper tray. Therefore, for example, in the case when the apparatus is used simply as a telephone, an operator can manipulate the operation panel for dialing without opening the combined manuscript holder and record paper tray.

Moreover, when the combined manuscript holder and recording paper tray is raised up to the opened position, is positioned to extend rearward and obliquely upward behind the recording paper outlet opening. Therefore, the combined manuscript holder and recording paper tray can serve not only as a manuscript holder but as a recording paper tray.

Still further, since this combined manuscript holder and recording paper tray has a long length reaching to the front end of the front end when it is closed, its length is sufficiently long enough to support a large size recording paper or a manuscript in a stable condition, without increasing overall size of the apparatus main body.

In other words, if it is allowed that this combined manuscript holder and recording paper tray can be made short, the apparatus main body itself can be made small correspondingly. Yet further, when the combined manuscript and recording paper tray is used at its opened position; i.e. when used as the manuscript holder, the cutout formed at the center of the upper end of the combined manuscript and recording paper tray can facilitate or ease manual operations for setting manuscripts or taking out recording papers.

Secondly, the present invention has an another purpose, in view of above problems and disadvantages encountered in the conventional art, to provide an information communication apparatus such as a facsimile machine wherein the layout of the dialing buttons are designed so as to take into consideration its operability.

To this end, a second aspect of the present invention provides an information communication apparatus which comprises a plurality of dialing buttons consisting of a matrix of a plurality of lines and rows, and said plurality of lines and rows are disposed obliquely with respect to the front end of the apparatus main body so that these dialing buttons are obliquely arrayed against an operator who stands directly to oppose to the apparatus main body. In this case, an inclination of laterally arrayed buttons (i.e. an inclination of said line) is determined so as to obliquely rise rightward in the case where the apparatus is designed for right-handers. To the contrary, this inclination of laterally arrayed buttons is determined to obliquely rise leftward in the case where the apparatus is designed for left-handers.

With this arrangement, in accordance with the present invention, an operator can easily manipulate dialing buttons since the dialing buttons are arrayed obliquely. Here, it is found that an inclined angle of laterally arrayed buttons with respect to the front edge of the apparatus main body is preferable if it is in a range of 15 to 25 degrees, from the view point of human engineering aspect in considering the relationship between the inclination of the laterally arrayed buttons and their operability. Especially, an approximately 20 degrees was best. By the way, an inclination of longitudinally arrayed dialing buttons (i.e. an inclination of said row) is not so important for the operability. However, it is preferable to arrange them so as to be perpendicular to the laterally arrayed buttons.

The above and other objects, features and advantages of the present invention will become more apparent from the following detailed description which is to be read in conjunction with the accompanying drawings.

DETAILED DESCRIPTION OF THE PREFERRED EMBODIMENT

Figure 1:
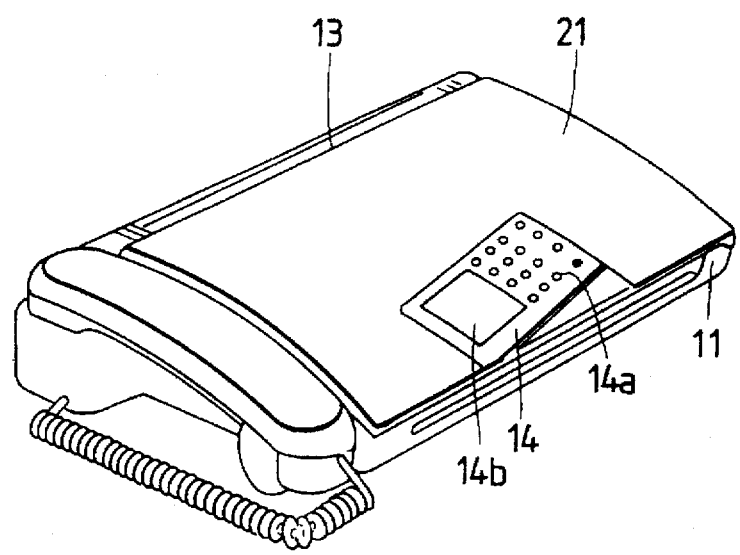
FIG. 1 is a perspective schematic view showing an information communication apparatus in accordance with the present invention in which its combined manuscript holder and recording paper tray is closed.

Hereinafter, referring now to the accompanying drawings, an embodiment of the present invention is explained in detail.

In FIGS. 1 through 4, a reference numeral 11 denotes an apparatus main body (i.e. a main body of a facsimile machine). This apparatus main body 11 includes a manuscript inlet opening 12 provided at the center of its upper surface, a recording paper outlet opening 13 provided at its rear end, and an operation panel portion 14 provided at the center of its front end. This operation panel portion 14 comprises dialing buttons 14a and a display unit 14b and so on, which are used for ordinary communication functions other than transmission of manuscripts.

Figure 5:
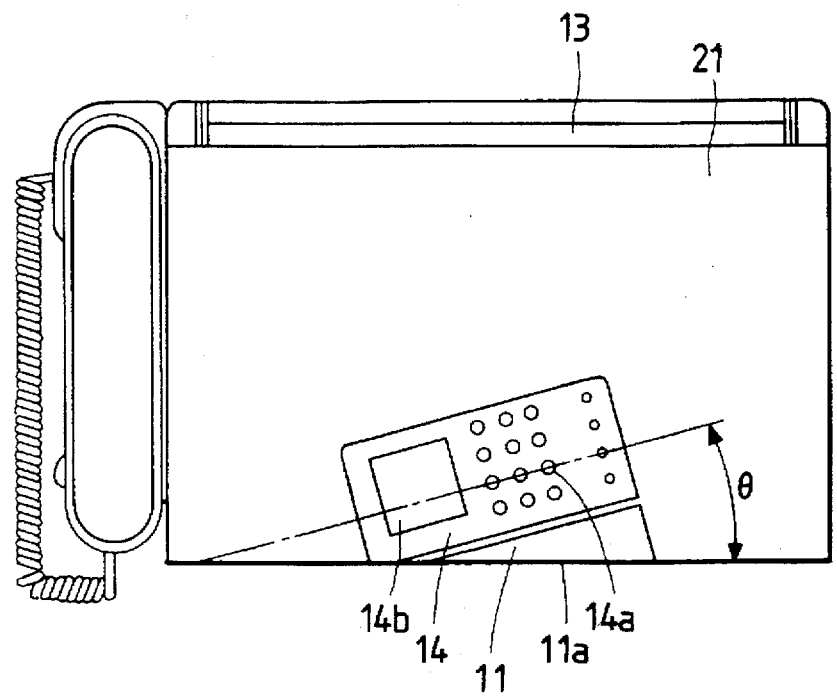
FIG. 5 is a plan view of the information communication apparatus in accordance with the present invention.
Figure 7:
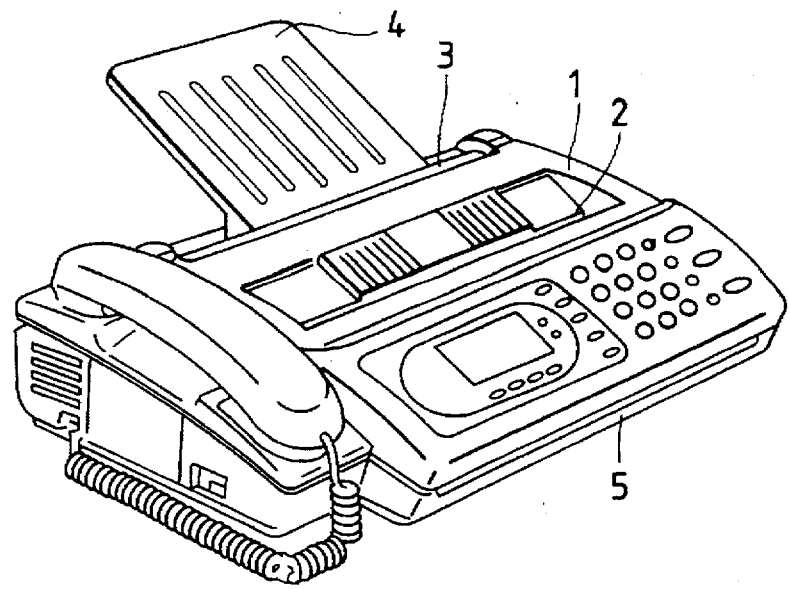
FIG. 7 is a perspective schematic view showing a conventional information communication apparatus.
Figure 6A:
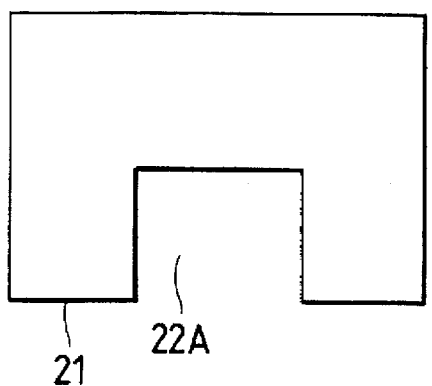
FIGS. 6(a) to 6(e) are view showing various modifications of the combined manuscript holder and recording paper tray in accordance with the present invention.
Figure 6B:
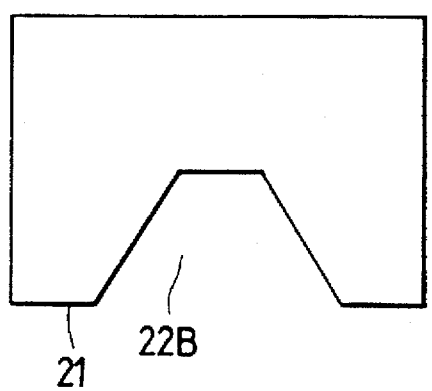
Figure 6C:
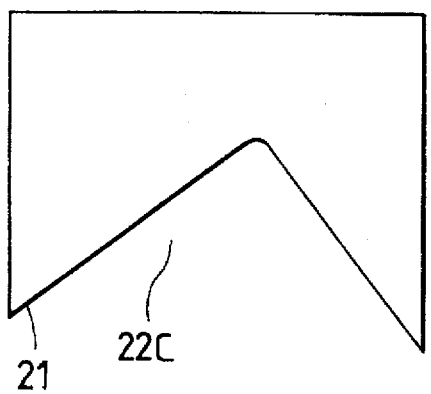
Figure 6D:
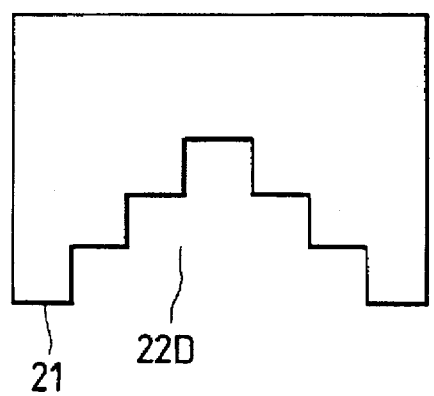
Figure 6E:
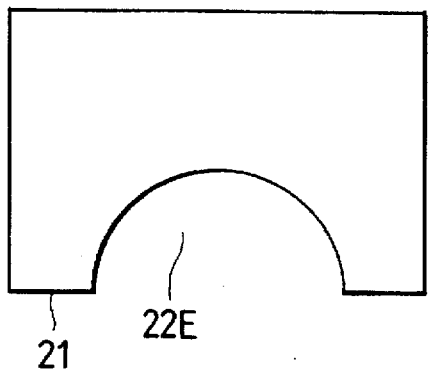

These dialing buttons 14a and display unit 14b of the operation panel portion 14 are disposed obliquely with respect to the apparatus main body 11, as shown in FIG. 5. In more detail, the dialing buttons 14a and the display unit 14b are obliquely arrayed so as to rise rightward with respect to the front edge of the apparatus main body 11. Such an inclined layout of dialing buttons 14a eases dialing operability for right-handers in this case, from the view point of human engineering.

As an inclined angle $\Theta$, a range from 15 to 25 degrees is preferable. Especially, 20 degrees is most preferable angle. In the case where the apparatus is designed for left-handers, above inclined layout should be, of course, oppositely arranged.

Furthermore, on the front end of the upper surface of the apparatus main body 11, there are provided various operation buttons 15 to be used when manuscripts are transmitted. These operation buttons 15 are positioned so as to be covered by a combined manuscript and recording paper tray 21 that is described later in detail. Inside of the apparatus main body 11, there are housed a transmitting portion 17 and a receiving portion 19. The transmitting portion 17 functions to read a manuscript 16 inserted from the manuscript inlet opening 12 and to transmit it through an ordinary communication network. And, the receiving portion 19 functions to record received information on a recording paper 18 and to bring it out from the recording paper outlet opening 13. Moreover, there is provided a manual cutter 20 just above the recording paper outlet opening 13.

Figure 2:
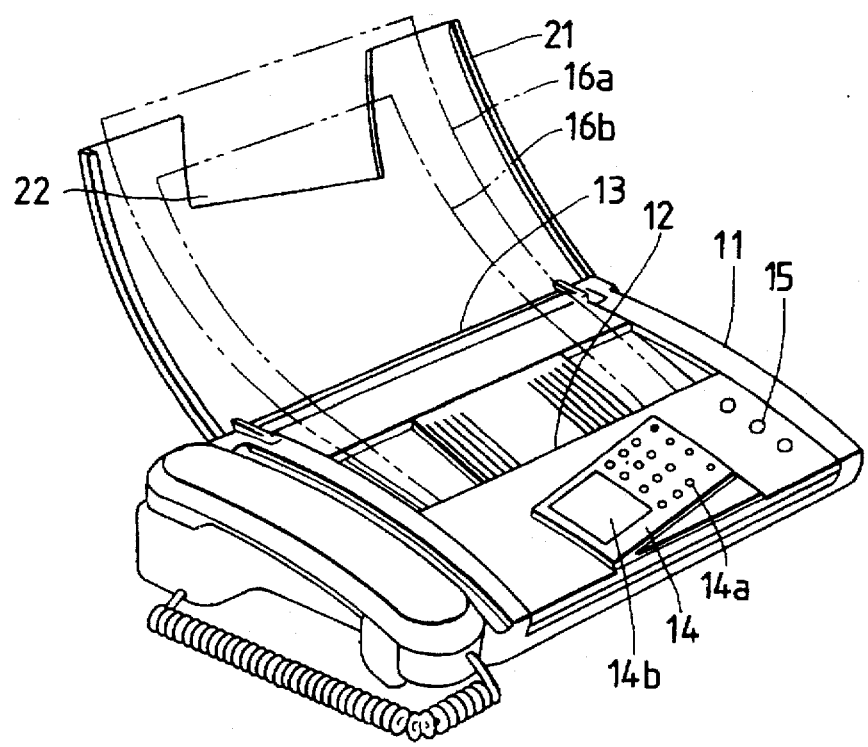
FIG. 2 is a perspective schematic view showing an information communication apparatus in accordance with the present invention in which its combined manuscript holder and recording paper tray is opened.
Figure 4:
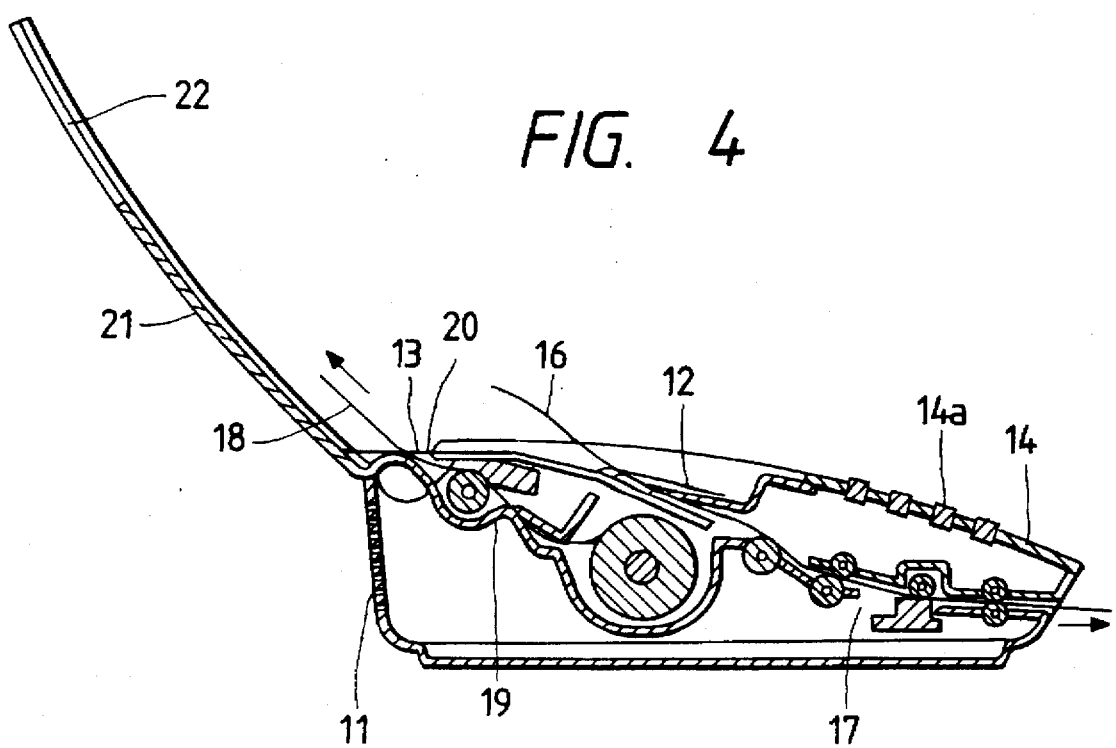
FIG. 4 is a cross-sectional schematic view of the information communication apparatus in the condition shown in FIG. 2.

A reference numeral 21 is the combined manuscript holder and recording paper tray, which is hingedly supported on the apparatus main body 11 adjacent to the recording paper outlet 13 so as to be opened or closed. When this combined manuscript holder and recording paper tray 21 is located at its opened position as shown in FIGS. 2 and 4, the combined manuscript holder and recording paper tray 21 extends rearward and obliquely upward. To the contrary, when this combined manuscript holder and recording paper tray 21 is located at its closed position as shown in FIGS. 1 and 3, the combined manuscript holder and recording paper tray 21 covers the upper surface of the apparatus main body 11.

Furthermore, in its closing operation, the rear end of the combined manuscript holder and recording paper tray 21 shifts forward to stride over the recording paper outlet opening 13. Therefore, the recording paper outlet opening 13 is opened to the air even when the combined manuscript holder and recording paper tray 21 is closed.

Still further, the combined manuscript holder and recording paper tray 21 is formed in a curved configuration so as to fit to the curvature of the upper surface of the apparatus main body 11. And the length of the combined manuscript holder and recording paper tray 21 is so long as the front (distal) end of the combined manuscript holder and recording paper tray 21 reaches the front edge of the apparatus main body 11.

Yet further, the combined manuscript holder and recording paper tray 21 has a cutout 22 formed on its front (distal) end portion, so that the operation panel portion 14 can be exposed without being covered by the combined manuscript holder and recording paper tray 21. That is, the combined manuscript holder and recording paper tray 21 can cover almost all the upper surface of the apparatus main body 11 except the operation panel portion 14, as shown in FIGS. 1 and 5.

By the way, the upper surface of the operation panel portion 14 is formed so as to slightly protrude upward from the upper surface of the apparatus main body 11. Then, this protruded amount is designed to be substantially equal with the thickness of the combined manuscript holder and recording paper tray 21, so that the upper surface of the combined manuscript holder and recording paper tray 21 can be leveled with the upper surface of the operation panel portion 14 when the combined manuscript holder and recording paper tray 21 is closed. Such a constitution is advantageous in bringing good appearance and realizing easy dusting.

Hereinafter, an operation of the information communication apparatus constituted as described above is explained.

Figure 3:
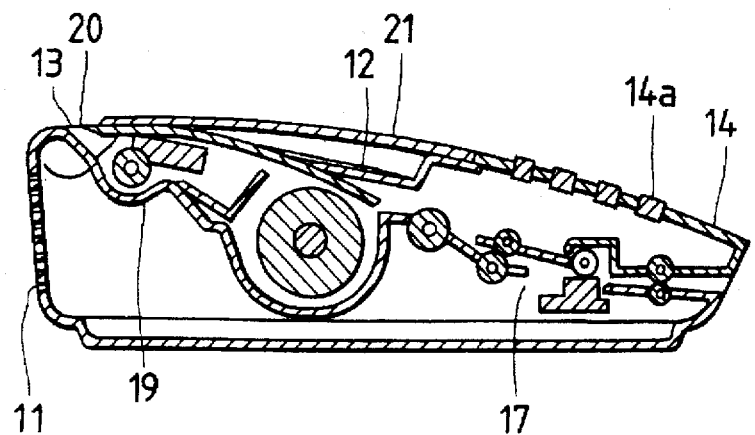
FIG. 3 is a cross-sectional schematic view of the information communication apparatus in the condition shown in FIG. 1.

In the case where frequency of receipt of letters is not so many, the combined manuscript holder and recording paper tray 21 is usually positioned at its closed condition as shown in FIGS. 1 and 3. By this operation, almost all the upper surface of the apparatus main body 11 including the manuscript inlet opening 12 is covered by the combined manuscript holder and recording paper tray 21. Accordingly, it becomes possible to prevent dust or small particles from entering inside of the apparatus main body 11. And further, it does not occupy a larger space since there is no member protruding upward or rearward from the apparatus main body 11.

When a letter is received, the recording paper 18 is taken out from the recording paper outlet 13 after having been recorded at the receiving portion 19. In this case, since the combined manuscript holder and recording paper tray 21 is positioned in front of the recording paper outlet opening 13, the recording paper 18 can be brought out without being interfered with any obstruction. When the receiving operation is finished, the only thing needed to do by an operator is cutting the recording paper 18 by use of the manual cutter 20.

Furthermore, in the case when this information communication apparatus is used as a normal telephone, the work of operator is simply manipulating the operation panel portion 14 for dialing. It would be needless to say that the combined manuscript holder and recording paper tray 21 is kept at its closed position during the dialing operation for the above telephone call. Therefore, compared with the previously explained prior art, the dialing operation for the telephone call becomes simple in that the combined manuscript holder and recording paper tray 21 is not required to open. Further, since the operation buttons 15 are covered by the combined manuscript holder and recording paper tray 21, it is not feared that these operation buttons 15 are mistakenly operated.

Next, in the case when this information communication apparatus is used as a facsimile machine, the combined manuscript holder and recording paper tray 21 is raised to its opened position, as shown in FIGS. 2 and 4. In this case, an operator can hold the front edge of the combined manuscript holder and recording paper tray 21 by hands, as well as both sides of the combined manuscript holder and recording paper tray 21. Therefore, an opening operation of the combined manuscript holder and recording paper tray 21 becomes easy.

When the combined manuscript holder and recording paper tray 21 is in its opened position, the combined manuscript holder and recording paper tray 21 is positioned to extend toward obliquely upward as shown in FIG. 2. Thus, it becomes possible to feed a manuscript 16a or 16b to be transmitted into the manuscript inlet opening 12, by loading the manuscript 16a or 16 on the inclined slope of the combined manuscript holder and recording paper tray 21. Here, since the combined manuscript holder and recording paper tray 21 is so long as its front (distal) end reaches the front edge of the apparatus main body 11, it can stably support various sizes of manuscripts; for example, the manuscript 16a of B4 size and the manuscript 16b of A4 size as shown in FIG. 2.

Furthermore, in supporting a larger manuscript such as the manuscript 16a shown in FIG. 2, the cutout 22 formed at the front center of the combined manuscript holder and recording paper tray 21 does not deteriorate the supporting stability. Because, the both ends of the larger manuscript 16a can be supported firmly by both upper sides of the combined manuscript holder and recording paper tray 21. It should be rather noted that this cutout 22 eases a setting operation of a manuscript to be entered into the manuscript inlet opening 12. Because, this setting operation is normally carried out in such a manner that the operator lays a manuscript on the slope of the combined manuscript holder and recording paper tray 21 while holding the upper center of the manuscript. That is, an operator's hand is not obstructed by the upper end of the combined manuscript holder and recording paper tray 21.

Next, in the case when the frequency of receipt of letters is relatively many, the combined manuscript holder and recording paper tray 21 is normally set in its opened position as shown in FIG. 4. By this operation, the recording papers 18 taken out from the recording paper outlet opening 13 are piled up on the combined manuscript holder and recording paper tray 21. Thus, the operator can easily collect numerous recording papers. And further, it is apparent that the cutout 22 will further ease the operator gripping edges of the piled up recording papers in the above collecting operation.

The cutout 22 on the combined manuscript holder and recording paper tray 21 is not limited into the disclosed on in FIGS. 2 and 4, and can be modified into any of cutouts 22A, 22B, 22C, 22D, and 22E shown in FIGS. 6(a) to 6(e).

As is apparent from the foregoing description, in accordance with the present invention, there is provided an improved information communication apparatus (i.e. a facsimile machine in this embodiment). The apparatus essentially comprises: an apparatus main body; an operation panel portion provided at a front end of an upper surface of the apparatus main body; a manuscript inlet opening provided at substantially the center of the upper surface of said apparatus main body; a recording paper outlet opening provided behind the manuscript inlet opening on said apparatus main body; and a tray serving as a manuscript holder as well as a recording paper tray (i.e. a combined manuscript holder and recording paper tray) which is hingedly supported at a rear end of the apparatus main body so as to be opened or closed between an opened position where the tray extends rearward and obliquely upward and a closed position where the tray covers the upper surface of the apparatus main body.

And, the combined manuscript holder and recording paper tray is made longer compared with the conventional one. That is, its length is long enough to reach the front edge of the apparatus main body when it is in its closed position. Furthermore, an another characteristic feature of this combined manuscript holder and recording paper tray is being formed with a cutout at its front end so that the operation panel portion can be exposed without being covered by the manuscript holder and combined recording paper tray.

Accordingly, when the combined manuscript holder and recording paper tray is closed, it can serve as a cover plate concealing the manuscript inlet opening so as to prevent any dust or small particles from entering into the apparatus main body from the manuscript inlet opening. At the same time, in this case, an operator can manipulate the operation panel portion without opening any cover members since it exposes through the cutout formed on the combined manuscript holder and recording paper tray. Therefore, for example, in the case where the apparatus is used simply as a telephone, an operator can manipulate the operation panel for dialing without opening the combined manuscript holder and record paper tray.

Moreover, the combined manuscript holder and recording paper tray can serve not only as a manuscript holder but as a recording paper outlet tray, when it is raised at its opened position. Still further, compared with the conventional apparatus, the present invention provides a combined manuscript holder and recording paper tray having a longer length reaching to the front end of the front end when it is closed. Thus, it becomes possible to stably support a large size recording paper or a manuscript such as a B4 size paper, without increasing overall size of the apparatus main body.

Contrarily, in the case where this combined manuscript holder and recording paper tray can be made short, the apparatus main body itself can be made small correspondingly.

Yet further, when the combined manuscript and recording paper tray is used as a manuscript holder, the cutout formed at its upper center can facilitate or ease a manual operation for loading manuscripts or taking out recording papers.

Next, in accordance with an other aspect of the present invention, there are provided a plurality of dialing buttons consisting of a matrix of a plurality of lines and rows, and these lines and rows are disposed obliquely with respect to the front end of the apparatus main body. Thus, these dialing buttons are obliquely arrayed against an operator who stands directly to oppose to the apparatus main body, thereby realizing easy dialing operation. Because, an inclination of laterally arrayed buttons is designed to obliquely rise rightward for right-handers, or designed to obliquely rise leftward for left-handers, by taking human engineering into consideration.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An information communication apparatus associated with a facsimile machine comprising:

an apparatus main body;

an operation panel portion provided on an upper surface of said apparatus main body;

a display unit provided within a region of said operation panel portion, substantially at a central portion of said apparatus main body;

a manuscript inlet opening provided on the upper surface of said apparatus main body;

a curved plate member with a concave inside surface, serving as a cover and a manuscript holder, said plate member being hingedly supported on said apparatus main body so as to be opened or closed between an opened position where said plate member extends rearward and obliquely upward to hold both ends of a manuscript and guide the manuscript along said concave inside surface to said manuscript inlet opening so as to serve as said manuscript holder, and a closed position where said plate member covers said upper surface of the apparatus main body;

a baring portion formed at a center of said plate member so as to expose said display unit of said operation panel portion when said plate member is located at said closed position where the plate member covers the upper surface of said apparatus main body, and operation keys provided within a remaining region of said upper surface of said apparatus main body other than a region of said operation panel portion exposed by said baring portion so that said operation keys are concealed by said plate member when said plate member is located at said closed position, said operation keys being manipulated to transmit said manuscript to a communication partner through said facsimile machine.

2. An information communication apparatus in accordance claim 1, wherein said plate member includes two segments displaced laterally from said baring portion for supporting both edges of the manuscript when said plate member is located at said opened position, and at least one of said two segments of said plate member is arranged for covering said operation keys when said plate member is located at said closed position.

3. An information communication apparatus as recited in claim 1, wherein said apparatus main body has a predetermined lateral dimension, and said plate member extends laterally a distance shorter than said predetermined lateral dimension of said apparatus main body.

4. An information communication apparatus in accordance claim 1, wherein:

said plate member includes two segments laterally displaced in opposite directions from said baring portion for supporting both edges of the manuscript when said plate member is located at said opened position; and at least one of said two segments of said plate member is arranged for covering said operation keys when said plate member is located at said closed position.

5. An information communication apparatus associated with a facsimile machine comprising:

an apparatus main body;

an operation panel portion provided on an upper surface of said apparatus main body;

a display unit provided within a region of said operation panel portion, at a center of said apparatus main body;

a manuscript inlet opening provided on the upper surface of said apparatus main body;

a curved plate member with a concave inside surface, serving as a cover and a manuscript holder, said plate member being hingedly supported on said apparatus main body so as to be opened or closed between an opened position where said plate member extends rearward and obliquely upward to hold both ends of a manuscript and guide the manuscript along said concave inside surface to said manuscript inlet opening so as to serve as said manuscript holder, and a closed position where said plate member covers said upper surface of said apparatus main body;

a cutout formed centrally at a front end of said plate member so as to expose said display unit of said operation panel portion when said plate member is located at said closed position where the plate member covers the upper surface of said apparatus main body, and operation keys provided within a remaining region of said upper surface of said apparatus main body other than a region of said operation panel portion exposed by said cutout so that said operation keys are concealed by said plate member when said plate member is located at said closed position, said operation keys being manipulated to transmit said manuscript to a communication partner through said facsimile machine.

6. An information communication apparatus associated with a facsimile machine comprising:

an apparatus main body;

an operation panel portion provided on an upper surface of said apparatus main body;

a display unit provided within said operation panel portion, at a lateral center of said apparatus main body;

a manuscript inlet opening provided on the upper surface of said apparatus main body;

a recording paper outlet opening provided on said upper surface of said apparatus main body, said outlet being offset rearwardly from said manuscript inlet opening;

a plate member, serving as a cover and a manuscript holder, being hingedly supported on said apparatus main body so as to be opened or closed between an opened position, where said plate member extends rearward and obliquely upward to hold both ends of a manuscript so as to guide the manuscript to said manuscript inlet opening and a closed position, where said plate member covers said upper surface of said apparatus main body without closing said recording paper outlet opening; a cutout formed centrally at a front end of said plate member so as to bare said display unit of said operation panel portion when said plate member is located at said closed position were the plate member covers the upper surface of said apparatus main body, and operation keys provided within a remaining region of said upper surface of said apparatus main body other than said display unit so that said operation keys are concealed by said plate member when said plate member is located at said closed position, said operation keys being manipulated to transmit said manuscript to a communication partner through said facsimile machine.

7. An information communication apparatus in accordance claim 6, wherein:

said plate member includes two segments laterally displaced in opposite directions from said cutout for supporting both edges of the manuscript when said plate member is located at said opened position, and one of said two segments of said plate member is arranged for covering said operation keys when said plate member is located at said closed position.

8. An information communication apparatus associated with a facsimile machine comprising:

an apparatus main body;

an operation panel portion provided on an upper surface of said apparatus main body;

communication keys provided within said operation panel portion at a center of said apparatus main body for connecting said facsimile machine to a communication partner through a communication network, said communication keys being provided within said operation panel portion and substantially at a central portion of said apparatus main body;

a manuscript inlet opening provided on the upper surface of said apparatus main body;

a curved plate member with a concave inside surface, serving as a cover and a manuscript holder, said plate member being hingedly supported on said apparatus main body so as to be opened or closed between an opened position where said plate member holds both edges of a manuscript and guides the manuscript along said concave inside surface to said manuscript inlet opening so as to serve as said manuscript holder, and a closed position where said plate member covers said upper surface of said apparatus main body;

a baring portion formed at a center of said plate member so as to expose said communication keys on said operation panel portion when said plate member is located at said closed position where the plate member covers the upper surface of said apparatus main body, and operation keys provided within a remaining region of said upper surface of said apparatus main body other than a region of said operation panel portion exposed by said baring portion so that said operation keys are concealed by said plate member when said plate member is located at said closed position, said operation keys being manipulated to transmit said manuscript to said communication partner through said facsimile machine.

9. An information communication apparatus in accordance claim 8, wherein:

said plate member includes two segments laterally displaced in opposite directions from said baring portion for supporting both edges of the manuscript when said plate member is located at said opened position, and at least one of said two segments of said plate member is arranged for covering said operation keys when said plate member is located at said closed position.

10. An information communication apparatus associated with a facsimile machine comprising:

an apparatus main body;

an operation panel portion provided on an upper surface of said apparatus main body;

a display unit provided within said operation panel portion and substantially at a central portion of said apparatus main body;

a manuscript inlet opening provided on the upper surface of said apparatus main body;

a curved plate member with a concave inside surface, serving as a cover and a manuscript holder, said plate member being hingedly supported on said apparatus main body so as to be opened or closed between an opened position where said plate member holds both ends of a manuscript and guide the manuscript along said concave inside surface to said manuscript inlet opening so as to serve as said manuscript holder, and a closed position where said plate member covers said upper surface of the apparatus main body;

a baring portion formed at a center of said plate member so as to expose said display unit on said operation panel portion when said plate member is located at said closed position where the plate member covers the upper surface of said apparatus main body, and operation keys provided within a remaining region of said upper surface of said apparatus main body other than a region of said operation panel portion exposed by said baring portion so that said operation keys are concealed by said plate member when said plate member is located at said closed position, said operation keys being manipulated to transmit said manuscript to a communication partner through said facsimile machine, wherein an exposed region of said operation panel portion protrudes upwardly from the upper surface of said apparatus main body with a height substantially equal to a thickness of said plate member, so that an upper surface of said plate member is flush with the upper surface of said exposed region of said operational panel portion when said plate member is located at said closed position.

11. An information communication apparatus associated with a facsimile machine comprising:

an apparatus main body;

an operation panel portion provided on an upper surface of said apparatus main body;

a display unit provided within a region of said operation panel portion, substantially at a central portion of said apparatus main body;

a manuscript inlet opening provided on the upper surface of said apparatus main body;

a curved plate member with a concave inside surface, serving as a cover and a manuscript holder, said plate member being hingedly supported on said apparatus main body so as to be opened or closed between an opened position where said plate member extends rearward and obliquely upward to hold both ends of a manuscript and guide the manuscript along said concave inside surface to said manuscript inlet opening so as to serve as said manuscript holder, and a closed position where said plate member covers said upper surface of the apparatus main body; and a baring portion formed at a center of said plate member so as to expose said display unit of said operation panel portion when said plate member is located at said closed position where the plate member covers the upper surface of said apparatus main body.

12. An information communication apparatus associated with a facsimile machine comprising:

an apparatus main body;

an operation panel portion provided on an upper surface of said apparatus main body;

communication keys provided within said operation panel portion at a center of said apparatus main body for connecting said facsimile machine to a communication partner through a communication network, said communication keys being provided within said operation panel portion and substantially at a central portion of said apparatus main body;

a manuscript inlet opening provided on the upper surface of said apparatus main body;

a curved plate member with a concave inside surface, serving as a cover and a manuscript holder, said plate member being hingedly supported on said apparatus main body so as to be opened or closed between an opened position where said plate member holds both ends of a manuscript and guides the manuscript along said concave inside surface to said manuscript inlet opening so as to serve as said manuscript holder, and a closed position where said plate member covers said upper surface of said apparatus main body; and a baring portion formed at a center of said plate member so as to expose said communication keys on said operation panel portion when said plate member is located at said closed position where the plate member covers the upper surface of said apparatus main body.

13. An information communication apparatus associated with a facsimile machine comprising:

an apparatus main body;

an operation panel portion provided on an upper surface of said apparatus main body;

a display unit provided within said operation panel portion and substantially at a central portion of said apparatus main body;

a manuscript inlet opening provided on the supper surface of said apparatus main body;

a curved plate member with a concave inside surface, serving as a cover and a manuscript holder, said plate member being hingedly supported on said apparatus main body so as to be opened or closed between an opened position where said plate member holds both ends of a manuscript and guides the manuscript along said concave inside surface to said manuscript inlet opening so as to serve as said manuscript holder, and a closed position where said plate member covers said upper surface of the apparatus main body;

a baring portion formed at a center of said plate member so as to expose said display unit of said operation panel portion when said plate member is located at said closed position where the plate member covers the upper surface of said apparatus main body, and operation keys provided within a remaining region of said upper surface of said apparatus main body other than a region of said operation panel portion exposed by said baring portion so that said operation keys are concealed by said plate member when said plate member is located at said closed position, wherein an exposed region of said operation panel portion protrudes upwardly from the upper surface of said apparatus main body with a height substantially equal to a thickness of said plate member, so that an upper surface of said plate member is flush with the upper surface of said exposed region of said operational panel portion when said plate member is located at said closed position.

* * * * *